United States Patent [19]

Dorren

[11] 3,886,312

[45] May 27, 1975

[54] DECODER FOR FOUR CHANNEL RECORD

[75] Inventor: Louis Dorren, Millbrae, Calif.

[73] Assignee: Quadracast Systems, Inc., San Mateo, Calif.

[22] Filed: Aug. 16, 1973

[21] Appl. No.: 388,822

[52] U.S. Cl. .................... 179/1 GQ; 179/100.4 ST

[51] Int. Cl. ............................................ H04n 5/00

[58] Field of Search .... 179/15 BT, 1 GQ, 100.4 ST, 179/100.1 TD; 329/122, 123; 325/346

[56] References Cited

UNITED STATES PATENTS

| | | | |
|---|---|---|---|
| 2,989,622 | 6/1961 | Doherty | 325/346 |
| 3,286,188 | 11/1966 | Castellano | 329/122 |
| 3,551,829 | 12/1970 | Haggai | 329/122 |
| 3,611,168 | 10/1971 | Haggai | 325/346 |
| 3,626,301 | 12/1971 | Develet | 329/122 |
| 3,686,471 | 8/1972 | Takahashi | 179/100.4 ST |
| 3,706,932 | 12/1972 | Hughes | 329/122 |

*Primary Examiner*—Kathleen H. Claffy
*Assistant Examiner*—Thomas D'Amico
*Attorney, Agent, or Firm*—Robert G. Slick

[57] ABSTRACT

A decoder is provided for a four channel phonograph record of the type wherein the A minus B signal (or C minus D) is modulated on an FM carrier. The FM signal is passed through a phase detector which forms part of a phase locked loop circuit which generates an error voltage; the error voltage is used as the A minus B audio signal which is then matrixed with the A plus B signal to yield two signals. A double feedback path is supplied for the phase locked loop, permitting the circuit to operate effectively when the percentage deviation of the FM signal is extremely high. A dropout compensator is also provided which is particularly effective for worn or dusty records.

1 Claim, 3 Drawing Figures

DECODER FOR FOUR CHANNEL RECORD

SUMMARY OF THE INVENTION

In a true four channel phonograph disc record, four signals are contained within the standard stereo groove. Looking at one side of the groove, the standard modulation from 50 Hz to 15 kHz is used for the A plus B information while the A minus B signal is carried on the same side of the groove by frequency modulating the signal on a carrier wherein the carrier frequency is on the order of 30 kHz. The other side of the groove contains the opposite channel with the C plus D and C minus D carried in the same manner.

In the past it has been necessary to use many tuned networks and a tuned ratio detector or discriminator to extract the A minus B signal from the record. This technique becomes very cumbersome to adjust and align and also limits the front to rear separation which is possible.

In accordance with the present invention, a phase locked loop circuit is employed which completely eliminates the need for tuned networks for decoding. The technique of the present invention provides a simple, inexpensive method of extracting the A minus B signal. No adjustment of the circuit is required and standard components can be used. In addition, the circuitry of the present invention provides a high degree of separation between the back and the front information. It also provides much greater linearity in the demodulated output, i.e. the output signal has lower distortion.

Although the phase locked loop circuit is an efficient decoding device for a four channel record, certain problems are encountered in phonograph records which are not encountered in conventional FM radio reception so that it is desirable to modify the phase locked loop circuit for the most effective results.

In a conventional FM radio system, the deviation is small in comparison with the transmission frequency. For instance, the deviation might be 75 kHz and with the usual FM IF amplifier at 10.7 MHz, the deviation is only about 10%. However in a phonograph record, the carrier is usually 30 kHz and a deviation of about 15 kHz is applied to this carrier. Thus, the deviation in a typical phonograph record system is about 50%, and this introduces special problems.

The usual phase locked loop circuit designed for a relatively narrow band of frequencies does not work well when the deviation is high. The voltage controlled oscillator will frequently get out of lock and will then go into wide excursions of over correction in an attempt to get back into lock. It is possible to eliminate this problem and still use a standard phase locked loop configuration by reducing the tracking bandwidth of the circuit, but the demodulated output will then suffer from degraded frequency response and considerably lower output level. A similar condition may be produced with records which are worn or dusty where the carrier may be temporarily lost.

In accordance with the improvement of the present invention, these problems inherent in standard phase locked loop tracking methods are solved by dividing the loop into two sections of feedback, one of which is limited to DC feedback and the other of which is an AC bandpass feedback circuit. In this manner, the lock and tracking ranges of the AC and the DC loops may be independently controlled. The DC loop gain will control the lock range of the phase locked loop and the more this gain, the wider the lock range. The DC loop is actually a low pass filter with a cut-off frequency of about 40 Hz so that it only affects the lock range of the phase-locked loop. The bandpass effect of the AC loop will control the tracking range and thus the recovered demodulated audio bandwidth. The AC loop is a bandpass filter with a response of approximately 50 Hz to 15 kHz, and thus controls only the tracking range and the recovered audio bandwidth.

A further advantage of the circuit of the present invention is that a memory function may be applied to the DC loop to prevent wide voltage controlled oscillator excursions if the carrier is lost temporarily as may easily happen with a worn or dusty phonograph record.

DESCRIPTION OF THE PREFERRED EMBODIMENTS

Figures 1, 2:
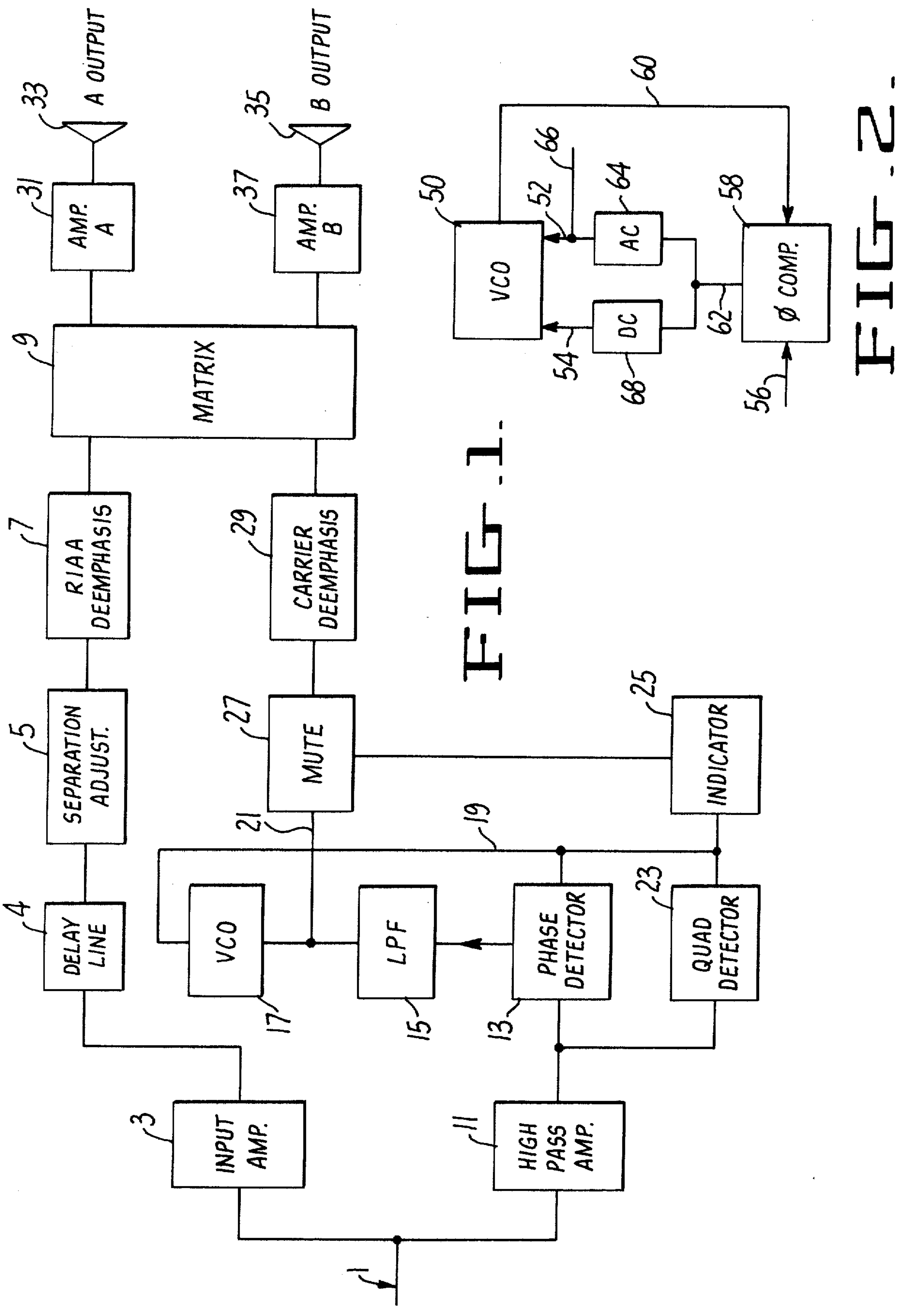
FIG. 1 of the drawings is a block diagram illustrating the basic use of phase locked loop in a phonograph record demodulator.
FIG. 2 is a block diagram of a circuit employing a double feedback loop.

Referring now to the block diagram of FIG. 1, the composite signal from one side of the groove comes from the pickup and enters the system through line 1. It will be understood, of course, that the pickup will generate two separate composite signals, but both signals will be processed in identical sets of equipment so that only one will be described. For instance, the signal coming through line 1 might be the left channel and this will contain the A plus B information in the frequency range from 50 Hz to 15 kHz and also the 30 kHz carrier signal having A minus B signal modulated thereon by FM.

One portion of the entering signal goes through the input amplifier 3; the signal from this amplifier, which is essentially only the A plus B signal is sent to a delay line 4 to correct timing errors and then to a separation adjustment network 5 and may be passed through a deemphasis network 7 and into the first input of matrix 9. The function of the matrix will be later discussed.

Another portion of the signal from line 1 goes to a high pass amplifier 11 where the low frequency components are removed and the 30 kHz carrier signal amplified. A limiter may also be placed here to remove any unwanted residual AM from the signal. From the high pass amplifier 11 the signal goes to a phase detector 13 and the output of the phase detector is passed through a low pass filter 15, to a voltage controlled oscillator 17 (VCO) which has a feedback loop 19 to the phase detector. The free running frequency of the VCO is approximately that of the carrier. The output from the low pass filter 15 is a DC error voltage which is used to cause the voltage controlled oscillator 17 to track the input signal. The error voltage is the audio output from the desired FM carrier because as the carrier is deviated, the phase locked loop will track and yield audio output at the low pass filter. This audio output is taken through line 21 and is the A minus B signal.

A portion of the signal from a high pass amplifier 11 is passed through a quadrature phase detector 23 and may be used to activate an indicator 25 to show when four channel record is being played. The quadrature phase detector is used to sense the lock of the voltage controlled oscillator 17 with the input signal and gives a DC output which can activate the indicator 25 as well as the muting gate 27. The signal is then passed through a carrier de-emphasis network 29 and to the second input of matrix 9. If active audio compression is used in the recording of the phonograph record, an active audio expansion may be employed between 29 and 9.

In the matrix 9, the direct A plus B signal from the input amplifier is added to the A minus B signal from the error detector to yield two channels, namely, a channel A which is amplified at 31 and passed to speaker 33 and a B signal which is amplified by amplifier 35 and passed through speaker 37. Thus, the composite signal to line 1 is divided into two basic components so that the single input 1 yields channels A and B. Obviously the equipment is duplicated for the other side of the groove to yield signals C and D in the same manner.

The separation adjustment 5 can be merely an attenuator and adjustment of this will give the proper ratio of A plus B to A minus B, yielding the maximum separation. The mute circuit 27 inhibits the A minus B output when there is no carrier present so that only the A plus B signal will pass into the matrix so that both outputs 33 and 35 will contain the A plus B information.

In the circuit shown in block diagram form in FIG. 2, the voltage controlled oscillator 50 has two feedback paths, namely an AC feedback line 52 and a DC feedback line 54. Although these are shown for illustration purposes as being separate, parallel path, in a practical circuit the paths can be either parallel or in series, and in the embodiment illustrated in detail, the two paths actually are in series. The carrier is inserted in the usual manner through line 56 to the phase detector 58 and in the phase detector the output from the VCO through line 60 is compared with the phase of the incoming carrier on line 56 and, if a difference exists, an error voltage is generated on line 62. Line 62 leads to a bandpass filter 64 which constitutes the AC loop and the output from the filter is passed through the input 52 as previously described. This AC error voltage also constitutes the desired audio output which is taken from line 66. Output from line 62 is also passed through a low pass filter 68 and the output from this filter constitutes the DC feedback voltage which is taken from the filter and passed through line 54 to the VCO 50. Thus the stabilized DC voltage will control the lock range of the phase locked loop and prevent a wide excursion which might be obtained when using a standard phase locked loop circuit to demodulate an unusually high deviation percentage signal. At the same time the AC loop functions in the normal manner to serve as a precise error voltage to control the tracking range and also to yield the desired demodulated audio. The recovered audio bandpass may be shaped by the characteristics of the AC bandpass filter.

Figure 3:
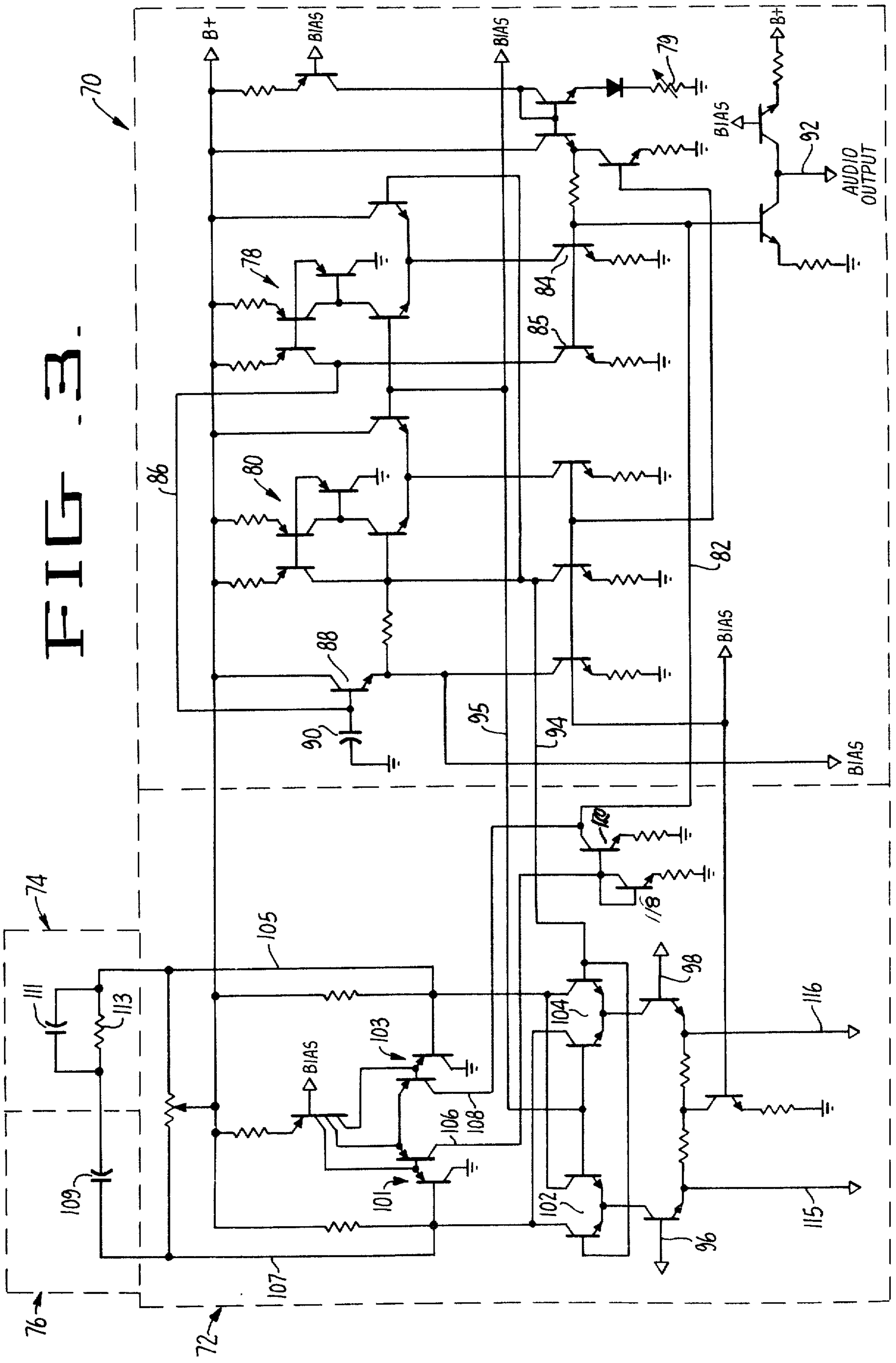
FIG. 3 is a schematic diagram of a practical circuit for accomplishing the purposes of the present invention.

In FIG. 3 there is shown a practical circuit for carrying out the present invention. The circuit includes four principal components, namely, a voltage control oscillator 70, a comparator or phase detector circuit 72, an AC feedback circuit 74 and a DC feedback circuit 76.

The voltage controlled oscillator 70 or VCO consists primarily of two Schmitt triggers 78 and 80 which act as a free running multivibrator wherein the free running frequency is determined by resistor 79 and capacitor 90. In the usual phonograph record decoder this free running frequency would be about 30 kHz. As will be later explained in detail, the error voltage from the phase detector 72 is applied from line 82 through transistors 84 and 85 to the triggers 78 and 80 and it is this voltage which determines the charge time of capacitor 90 and thus the actual frequency of the VCO. The frequency of the voltage controlled oscillator is fed for comparison purposes to the phase detector as is usual in a phase locked loop. In the particular embodiment shown this is taken off as an unbalanced voltage against ground through line 94, although as will be later apparent, this could be taken off as a balanced or differential voltage using lines 94 and 95.

The phase detector in this embodiment employs a balanced circuit and the transistor pairs 102 and 104 form the actual phase comparator circuitry. As is shown, the frequency of the VCO is fed through line 94 to the bases of the transistor pairs, while the incoming frequency is fed to the emitters of these pairs from lines 96 and 98. When the loop is in lock, there will be a 90° phase difference between the incoming voltages at the emitters and the bases of the comparator transistors and this will result in no output at the collectors of these transistors while if the loop is out of lock, an output voltage is produced. The collectors of the transistor pairs 102 and 104 are connected to the differential amplifying circuit (which forms an active filter) which includes transistors 101 and 103 and the bases of these amplifying transistors are interconnected through the filter circuits 74 and 76 to be described. Outputs from these amplifying transistors are taken from the respective collectors through lines 106 and 108, and connected to a single ended voltage in transistors 118 and 120 and thence to line 82 to provide the error signal as previously described. The error signal, in addition to being fed back to the VCO 70, constitutes the audio output and is taken through line 92.

The response characteristics of the amplifier or active filter made up by the transistor pairs 101 and 103 is controlled by the response shaping circuitry between them, i.e., the shaping path provided through lines 105 and 107 which passes through the filters 74 and 76. Although these filters are physically in series with each other, actually each acts independent of the other so that they are effectively in parallel. Filter 76 consists of a relatively large capacitor 109, suitably of 4 mfd. This shapes the amplifier as a DC filter and for frequencies from 0 to 40 Hz with the first breakpoint at approximately 4 Hz and the second breakpoint at 40 Hz. As will be later apparent, filter 74 has no influence at such low frequencies, so that effectively capacitor 109 will control the lock range of the phase locked loop and thus permit the circuit to be employed with a system having a high percentage of deviation, i.e., a circuit requiring a high lock range.

The capacitor 109 acts as a memory component in the feedback loop so even if the carrier is temporarily lost, the VCO will not go off on a wide excursion hunting for the proper frequency, but instead will "remember" the last frequency which was applied and will continue to supply a proper error voltage which will cause the VCO to continue to oscillate at the last frequency which was applied until the carrier is once more restored. The capacitor 109 functions as a memory circuit in the following manner:

When the PLL is in lock, the voltage across capacitor 109 is equalized and thus the capacitor equals a high impedance with respect to lines 105 and 107. However, if the PLL loses its input signal and tries to move back to the free running frequency, the voltage across the capacitor tries to change abruptly. When this occurs, the capacitor becomes a low impedance, inhibiting a radical or rapid change in the voltage across it and thusly, it sets up an artificial correction voltage at line 82 until such time as the input signal is restored and the loop again acquires lock.

The large capacitor exerts its smoothing effect only at relatively low frequencies and thus controls the lock range and acts as a memory element but does not have any effect on the relatively high frequency excursions of the oscillator in tracking the incoming signal. Thus, the AC loop functions independently to control the tracking range, providing a precise error voltage and to yield the desired audio.

The AC portion 74 of the shaping loop consists of a relatively low value resistor 113 and capacitor 111 in parallel. Suitably 113 can have a value of 1,000 ohms while capacitor 111 is 0,01 mfd. In such a circuit, filter 74 has a breakpoint at about 15 kHz so that the filter will pass all normal audio frequencies but will cut out high frequency components which might interfere with the operation of VCO.

As previously mentioned, the two filters, although physically in series, operate independently of each other. Thus, at low frequencies, the resistance of resistor 113 is so low that it does not constitute a limiting factor for the passage of low frequencies and the high capacitor of 109 determines the characteristics of the filter at low frequencies. On the other hand, at high frequencies, the impedance of 109 is so low that it has no influence on the passage of the high frequencies and only filter 74 is operative.

In the schematic diagram of FIG. 2, it was shown that the two filters were in parallel and that they formed the feedback path, i.e., the control voltage between the phase comparator and the VCO. Since these filters are the controlling factor in the operation of the amplifier of the phase comparator circuit of FIG. 3 and thus control the amount of the error voltage, they are effectively in the path of the error voltage and so the characteristics of these filters control independently the DC and AC feedback applied.

In many instances, it is desired to provide an indicator to show whether a multiple channel record is being played and also to mute the circuit if the incoming signal does not have the FM carrier input. Outputs for operating muting and indicating circuitry can be taken from lines 115 and 116.

Although certain specific details have been shown in a practical record decoder circuit, it will be obvious to those skilled in the art that many variations can be made without departing from the spirit of the invention.

For instance, an unbalanced output is shown taken through line 94 from the VCO to the phase comparator, while on the other hand, a balanced input is shown for the incoming frequency fed to the phase comparator. Either of these circuits can be balanced or unbalanced so that the balanced output could have been taken through lines 94 and 95 from the VCO to the comparator, while an unbalanced input to the phase comparator could be provided by biasing one of lines 96 and 98 and feeding the voltage to be compared through the other line.

I claim:

1. A decoder for a four channel phonograph record of the type wherein there is derived from each side of the groove of said phonograph record a composite signal containing two components, namely a first or audio frequency component containing A plus B information, and having a frequency in the range of 50 Hz to 15 kHz, and a second or R.F. component comprising a carrier with a frequency of about 30 kHz, having an A minus B audio signal frequency modulated thereon, comprising means for separating said second component from said composite signal, and feeding said second component to phase lock loop means including a voltage controlled oscillator, said voltage controlled oscillator having two feedback paths, namely a first feedback path including a low pass filter having a frequency range of from about 0 to 40 Hz, and a second feedback path including a band pass filter having a band pass of from about 50 to 15 kHz, means for extracting an error voltage from at least said second feedback path, said error voltage representing the audio component of said R.F. component representing the A minus B audio signal, and passing said audio component to matrix means together with said A plus B signal and means to obtain from said matrix means a separate A signal and a separate B signal.

* * * * *